(12) United States Patent
Lynch et al.

(10) Patent No.: US 7,280,588 B2
(45) Date of Patent: Oct. 9, 2007

(54) CORRELATION MODULE FOR USE IN A RADIO RECEIVER

(75) Inventors: James C. Lynch, Austin, TX (US); James Ward Girardeau, Jr., Austin, TX (US); Paul Morris Astrachan, Austin, TX (US)

(73) Assignee: ViXS Systems Inc., Toronto, Ontario (CA)

( * ) Notice: Subject to any disclaimer, the term of this patent is extended or adjusted under 35 U.S.C. 154(b) by 733 days.

(21) Appl. No.: 10/742,499

(22) Filed: Dec. 19, 2003

(65) Prior Publication Data

US 2005/0135464 A1 Jun. 23, 2005

Related U.S. Application Data

(63) Continuation-in-part of application No. 10/103,325, filed on Mar. 21, 2002.

(51) Int. Cl.
*H04B 1/69* (2006.01)
*H03D 1/00* (2006.01)

(52) U.S. Cl. ...................... 375/150; 375/343
(58) Field of Classification Search ............... 375/150, 375/343, 136, 147, 316; 708/422, 426
See application file for complete search history.

(56) References Cited

U.S. PATENT DOCUMENTS 5,970,060 A * 10/1999 Baier et al. ............... 370/342
6,954,483 B2 * 10/2005 Doetsch et al. ........... 375/136
2003/0112854 A1 * 6/2003 Shi et al. .................. 375/147
2003/0202569 A1 * 10/2003 Kim et al. ................ 375/150
2003/0231723 A1 * 12/2003 Hansen ..................... 375/343

* cited by examiner

Primary Examiner—Khai Tran

(57) ABSTRACT

A correlation module includes a plurality of first functional modules, a plurality of second functional modules, a plurality of function adjust modules, a summation module, a correlation value register, and a correlation evaluation module. The plurality of first functional modules is operably coupled to perform a first function upon a first corresponding pipelined data element to produce a first corresponding value. The plurality of second functional modules is operably coupled to perform a second function upon a second corresponding pipelined data element to produce a second corresponding value. The plurality of function adjust modules is operably coupled to selected ones of the plurality of first functional modules and to selected ones of the plurality of second functional modules. The summation module is operably coupled to sum the plurality of first corresponding values, the plurality of second corresponding values, and a previous correlation value to produce a current correlation value. The correlation evaluation module is operably coupled to compare the current correlation value with a correlation threshold to determine whether current pipelined data correlates with the expected pattern of the training sequence.

28 Claims, 7 Drawing Sheets radio receiver 10 functional diagram of data detection module 20 correlation module 66

2nd functional
module 108 & 110 function adjust
module 104 & 106

*implemented via shift left by N register*

1st functional
module 100 & 102 correlation example

| | -2 | -1 | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|---|
| corr value | 0 | 0 | -1 | -2 | 0 | 2 | 0 | -1 | 1 | 3 | 0 | -5 | 0 | 2 | -1 | -4 | 0 | 9 | 3 | 0 |
| prev corr | 0 | 0 | 0 | -1 | -2 | 0 | 2 | 0 | -1 | 1 | 3 | 0 | -5 | 0 | 2 | -1 | -4 | 0 | 9 | 3 |
| M9 | 0 | 0 | 0 | 0 | 0 | 0 | 0 | 0 | 0 | 0 | 0 | 0 | 0 | 0 | 0 | 0 | 0 | 1 | 1 | 0 |
| M8 | 0 | 0 | 0 | 0 | 0 | 0 | 0 | 0 | 0 | 0 | 0 | 0 | 0 | 0 | 0 | 0 | 2 | 2 | 0 | 0 |
| M7 | 0 | 0 | 0 | 0 | 0 | 0 | 0 | 0 | 0 | 0 | 0 | 0 | 0 | -2 | -2 | 0 | 0 | 0 | -2 | 0 |
| M6 | 0 | 0 | 0 | 0 | 0 | 0 | 0 | 0 | 0 | 0 | 0 | 0 | 2 | 2 | 0 | 0 | 0 | 2 | 0 | 0 |
| M5 | 0 | 0 | 0 | 0 | 0 | 0 | 0 | 0 | 0 | 0 | -2 | -2 | 0 | 0 | 0 | -2 | 0 | 0 | -2 | -2 |
| M4 | 0 | 0 | 0 | 0 | 0 | 0 | 0 | 2 | 2 | 0 | 0 | 0 | 2 | 0 | 0 | 2 | 2 | 2 | 0 | 2 |
| M3 | 0 | 0 | 0 | 0 | 0 | 0 | -2 | -2 | 0 | 0 | 0 | -2 | 0 | 0 | -2 | -2 | -2 | 0 | -2 | -2 |
| M2 | 0 | 0 | 0 | 0 | 2 | 2 | 0 | 0 | 0 | 2 | 0 | 0 | 2 | 2 | 2 | 0 | 2 | 2 | 0 | 0 |
| M1 | 0 | 0 | -1 | -1 | 0 | 0 | 0 | -1 | 0 | 0 | -1 | -1 | -1 | 0 | -1 | -1 | 0 | 0 | -1 | -1 |
| R0 | 0 | 0 | 0 | 0 | 0 | 0 | 0 | 0 | 0 | 0 | 0 | 0 | 0 | 0 | 0 | 0 | 1 | 1 | 0 |  |
| R-1 | 0 | 0 | 0 | 0 | 0 | 0 | 0 | 0 | 0 | 0 | 0 | 0 | 0 | 0 | 0 | 1 | 1 | 0 | 0 |  |
| R-2 | 0 | 0 | 0 | 0 | 0 | 0 | 0 | 0 | 0 | 0 | 0 | 0 | 0 | 0 | 1 | 1 | 0 | 0 | 0 |  |
| R-3 | 0 | 0 | 0 | 0 | 0 | 0 | 0 | 0 | 0 | 0 | 0 | 0 | 0 | 1 | 1 | 0 | 0 | 0 | 0 |  |
| R-4 | 0 | 0 | 0 | 0 | 0 | 0 | 0 | 0 | 0 | 0 | 0 | 0 | 1 | 1 | 0 | 0 | 0 | 1 | 0 |  |
| R-5 | 0 | 0 | 0 | 0 | 0 | 0 | 0 | 0 | 0 | 0 | 0 | 1 | 1 | 0 | 0 | 0 | 1 | 0 | 0 |  |
| R-6 | 0 | 0 | 0 | 0 | 0 | 0 | 0 | 0 | 0 | 0 | 1 | 1 | 0 | 0 | 0 | 1 | 0 | 0 | 1 |  |
| R-7 | 0 | 0 | 0 | 0 | 0 | 0 | 0 | 0 | 0 | 1 | 1 | 0 | 0 | 0 | 1 | 0 | 0 | 1 | 1 |  |
| R-8 | 0 | 0 | 0 | 0 | 0 | 0 | 0 | 0 | 1 | 1 | 0 | 0 | 0 | 1 | 0 | 0 | 1 | 1 | 1 |  |
| R-9 | 0 | 0 | 0 | 0 | 0 | 0 | 0 | 1 | 1 | 0 | 0 | 0 | 1 | 0 | 0 | 1 | 1 | 1 | 0 |  |
| R-10 | 0 | 0 | 0 | 0 | 0 | 0 | 1 | 1 | 0 | 0 | 0 | 1 | 0 | 0 | 1 | 1 | 1 | 0 | 1 |  |
| R-11 | 0 | 0 | 0 | 0 | 0 | 1 | 1 | 0 | 0 | 0 | 1 | 0 | 0 | 1 | 1 | 1 | 0 | 1 | 1 |  |
| R-12 | 0 | 0 | 0 | 0 | 1 | 1 | 0 | 0 | 0 | 1 | 0 | 0 | 1 | 1 | 1 | 0 | 1 | 1 | 0 |  |
| R-13 | 0 | 0 | 0 | 1 | 1 | 0 | 0 | 0 | 1 | 0 | 0 | 1 | 1 | 1 | 0 | 1 | 1 | 0 | 0 |  |
| R-14 | 0 | 0 | 1 | 1 | 0 | 0 | 0 | 1 | 0 | 0 | 1 | 1 | 1 | 0 | 1 | 1 | 0 | 0 | 1 |  |
| R-15 | 0 | 1 | 1 | 0 | 0 | 0 | 1 | 0 | 0 | 1 | 1 | 1 | 0 | 1 | 1 | 0 | 0 | 1 | 1 |  |

FIG. 8
correlation example correlation module 66

CORRELATION MODULE FOR USE IN A RADIO RECEIVER

CROSS REFERENCE TO RELATED PATENTS

This patent application is claiming priority under 35 USC § 120 as a continuation in part application to copending patent application entitled METHOD AND APPARATUS FOR ACCURATELY DETECTING PRESENCE OF A VALID SIGNAL, having a serial number of Ser. No. 10/103,325, and a filing date of Mar. 21, 2002.

BACKGROUND OF THE INVENTION

Technical Field of the Invention

This invention relates generally to radio receivers and more particularly to detection of valid signals using correlation.

DESCRIPTION OF RELATED ART

Wireless communication systems are known to include a plurality of wireless communication devices that communicate directly (e.g., point-to-point) or through an infrastructure. For direct communications, a wireless communication device, such as a radio, cellular telephone, station coupled to a personal computer or laptop, et cetera, transmits data on a particular radio frequency channel directly to another wireless communication device. For infrastructure-supported communications, a wireless communication device transmits data on an assigned radio frequency channel to an access point (or a base station). The access point determines the targeted wireless communication device from the received RF signals. If the targeted wireless communication device is affiliated with the access point, the access point transmits the data to the targeted wireless communication device on a radio frequency channel. If the targeted wireless communication device is not affiliated with the access point, the access point forwards the data to a central station, which routes the data to the access point that is affiliated with the targeted wireless communication device.

To ensure reliability of data transmissions within a wireless communication system and to ensure interoperability of differing manufacturers' equipment, standards have been developed. Such wireless communications standards include IEEE 802.11, Bluetooth, advanced mobile phone services (AMPS), digital AMPS, global system for mobile communications (GSM), code division multiple access (CDMA), local multi-point distribution services (LMDS), multi-channel, multi-point distribution systems (MMDS), and/or variations thereof.

Such standards prescribe operating parameters for particular types of wireless communication systems. For example, the IEEE 802.11a standard defines a wireless local area network that prescribes a frequency band of use, division of the frequency band into channels and sub-channels, encoding/decoding convention, modulation/demodulation convention, frame format, data rates, et cetera. Further, the IEEE 802.11a standard provides various combinations of data rates and modulation schemes, which can be selected via a coding rate corresponding to a particular modulation scheme.

In such standard compliant systems, data is transmitted in a particular format such that the targeted wireless communication device, or devices, can accurately recover the transmitted data. For instance, many standards prescribe for the use of preambles to inform the targeted wireless communication device, or devices, that data is to come. As such, the receiver portion of the targeted wireless communication device, or devices, monitors baseband signals (i.e., a modulated RF signal that has been converted down to baseband) to determine if the baseband signals contain a valid preamble. If a baseband signal includes a valid preamble, the receiver processes the baseband signal to recapture the transmitted data. To determine whether the baseband signal includes a valid preamble, the receiver includes a correlator.

As is known, a correlator compares the incoming baseband signal to a stored representation of a valid preamble. If the beginning portion of the incoming baseband signal (e.g., the preamble of a valid signal) matches the stored valid preamble, the correlator indicates that the signal is valid. When the correlator indicates that the preamble is valid, the remaining portions of the receiver are enabled to recover the data from the baseband signal.

An issue with such correlators is that they must be fast and accurate in identifying a valid preamble. For example, the preamble of an IEEE 802.11a packet includes ten short training symbols and two long training symbols that must be verified within a total of 16 micro seconds (8 for the short training symbols and 8 for the long training symbols). Each of the short training symbols uses 12 of 52 subcarriers of the channel while each of the long training symbols uses 52 of 52 subcarriers. Due to the complexity of the long training symbol, the short duration in which it must be verified, and the low power requirements typically associated with wireless communication, developing an accurate and efficient correlation module is essential.

Therefore, a need exists for a fast and accurate correlation module for using in radio receivers.

BRIEF SUMMARY OF THE INVENTION

The correlation module for use in a radio receiver of the present invention substantially meets these needs and others. In one embodiment, a correlation module, which may be used in a radio receiver, includes a plurality of first functional modules, a plurality of second functional modules, a plurality of function adjust modules, a summation module, a correlation value register, and a correlation evaluation module. The plurality of first functional modules is operably coupled to perform a first function upon a first corresponding pipelined data element to produce a first corresponding value. The plurality of second functional modules is operably coupled to perform a second function upon a second corresponding pipelined data element to produce a second corresponding value, wherein the second function is a complimentary function of the first function. The plurality of function adjust modules is operably coupled to selected ones of the plurality of first functional modules and to selected ones of the plurality of second functional modules, wherein each of the function adjust modules modifies a pipelined data element to produce the first or the second corresponding pipelined data element, respectively, wherein the selected ones of the plurality of first functional modules and the selected ones of the plurality of second functional modules corresponds to transitions in an expected pattern of the training sequence. The summation module is operably coupled to sum the plurality of first corresponding values, the plurality of second corresponding values, and a previous correlation value to produce a current correlation value. The correlation value register is operably coupled to store the current correlation value and, for subsequent correlation determinations, to provide the current correlation value as the previous correlation value to the summation module. The correlation evaluation module is operably coupled to compare the current correlation value with a correlation threshold to determine whether current pipelined data correlates with the expected pattern of the training sequence.

In another embodiment, a correlation module, which may be used in a radio receiver, includes first, second, third, and fourth correlation pipelines and first and second summation modules. The first correlation pipeline is operably coupled to process real data elements of the complex signal with real coefficients of an expected complex signal to produce a real correlation component. The second correlation pipeline is operably coupled to process the real data elements of the complex signal with imaginary coefficients of the expected complex signal to produce a real-imaginary correlation component. The third correlation pipeline is operably coupled to process imaginary data elements of the complex signal with the real coefficients to produce an imaginary-real correlation component. The fourth correlation pipeline is operably coupled to process the imaginary data elements of the complex signal with the imaginary coefficients to produce an imaginary correlation component. The first summation module is operably coupled to sum the real correlation component and the real-imaginary correlation component to produce a real correlation value. The second summation module is operably coupled to sum the imaginary-real correlation component with the imaginary correlation component to produce an imaginary correlation value.

BRIEF DESCRIPTION OF THE SEVERAL VIEWS OF THE DRAWINGS

FIG. 8 is a data/time table of the correlation module of FIG. 7; and

DETAILED DESCRIPTION OF THE INVENTION

Figure 1:
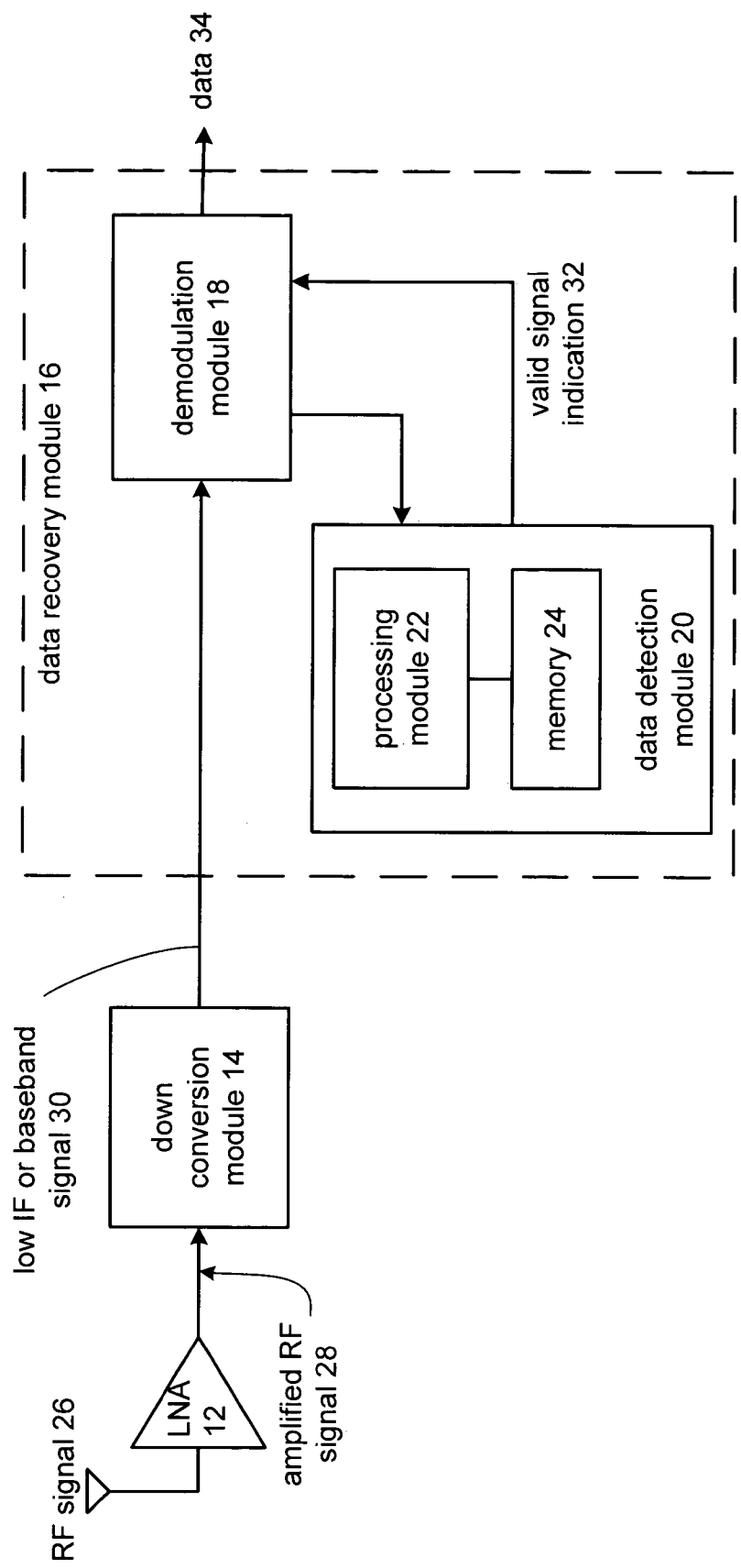
FIG. 1 is a schematic block diagram of a radio receiver in accordance with the present invention.

FIG. 1 illustrates a schematic block diagram of a radio receiver 10 that includes a low noise amplifier 12, a down conversion module 14, and a data recovery module 16. The data recovery module 16 includes a demodulation module 18 and a data detection module 20. The data detection module 20 includes a processing module 22 and memory 24. The processing module 22 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 24 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 22 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 24 stores, and the processing module 22 executes, operational instructions corresponding to at least some of the steps and/or functions illustrated in FIGS. 2-9.

In operation, the radio receiver 10 receives a radio frequency (RF) signal 26 via an antenna. The antenna is coupled to the low noise amplifier 12 and provides it with the RF signal 26. The low noise amplifier 12 amplifies the RF signal 26 to produce an amplified RF signal 28. As one of average skill in the art will appreciate, a bandpass filter may precede and/or follow the low noise amplifier to tune the radio receiver to a particular radio frequency.

The down conversion module 14 converts the amplified RF signal 28 into a low intermediate frequency (IF) signal or baseband signal 30. In one embodiment, the down conversion module 14 converts the RF signal 28 in to a low IF signal that has a carrier frequency of a few mega Hertz (MHz). In another embodiment, the down conversion module 14 converts the RF signal 28 into a baseband signal that includes an I (in-phase) component and a Q (quadrature) component. Note that the down conversion module 14 may include one or more intermediate frequency stages to step down the carrier frequency from that of the radio frequency to baseband.

The data recovery module 16 receives the low IF or baseband signal 30 via the data detection module 20 and the demodulation module 18. In power saving modes, the radio receiver 10 will disable at least a portion of the demodulation module 18 until the data detection module 20 has produced a valid signal indication 32. The data detection module interprets the baseband signal 30 to produce the valid signal indication 32. The processing performed by the data detection module 20 is further described with reference to FIGS. 2-9.

Figure 2:
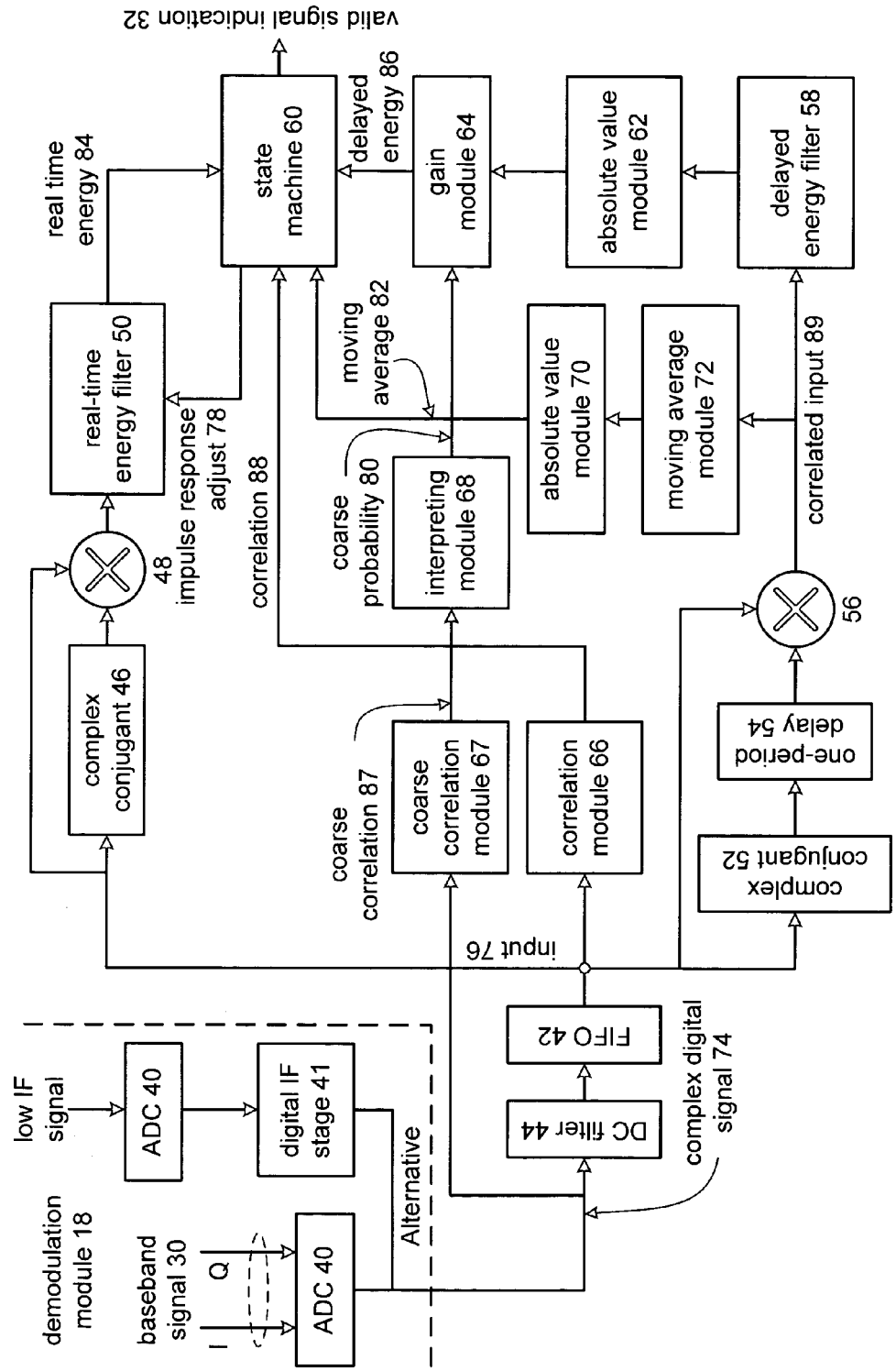
FIG. 2 is a functional schematic block diagram of a data detection module in accordance with the present invention.

FIG. 2 illustrates a functional diagram of the data detection module 20 coupled to a portion of the digital demodulation module 18. In one embodiment, the digital demodulation module 18 receives baseband signals 30 via an analog to digital converter (ADC) 40, which converts the I and Q components of the baseband signals 30 into a complex digital signal 74. Alternatively, the digital demodulation module 18 may be receive low IF signals 30 via the ADC 40, which converts the low IF signal 30 into a digital low IF signal. The digital IF stage 41 converts the digital low IF signal into the complex digital signal 74.

The data detection module 20 includes a first-in-first-out buffer 42, a DC filter 44, a complex conjugate module 46, a multiplier 48, a real time energy filter 50, a $2^{nd}$ complex conjugate module 52, a one-period delay module 54, a $2^{nd}$ multiplier 56, a delayed energy filter 58, a state machine 60, an absolute value module 62, a gain module 64, a correlation module 66, a coarse correlation module 67, an interpreting module 68, a second absolute value module 70, and a moving average module 72.

The DC filter 44, which may be programmable bypassed, receives the complex digital signal 74 and filters therefrom high frequency signal components to produce a filtered complex digital signal. The first-in-first-out buffer 42 temporarily stores the filtered complex digital signal 74 before providing it as an input 76 to the remainder of the data detection module 20. Note that, for the purposes of this discussion, a complex digital signal includes a real part and imaginary part, which may be represented by a single signal or separate signals.

The complex conjugate module 46 performs a complex conjugate function on input 76 to produce a conjugate value. The multiplier 48 multiplies the input 76 with the complex conjugate 46's output to produce a mixed complex input. For example, if the input 76 is represented by (Real+Imaginary,) then the complex conjugate module produces the conjugate value of (R−I) and the multiplier 48 produces the real signal of $(R^2+I^2)$.

The real time energy filter 50 receives the real signal from multiplier 48 and produces a real time energy value 84. The real time energy filter 50 is essentially a low pass filter that may have its impulse response adjusted in accordance with an impulse response adjust signal 78. For instance, during early detection of a valid signal, the impulse response of the real time energy filter may be fast and then slowed as the likelihood that the input is a valid signal. This allows the real time energy to reach an appropriate level quickly for valid signals and reduce the deviation of the level as the likelihood of the input being valid increases. The real time energy filter 50 provides the real time energy level 84 to the state machine 60, which determines the valid signal indication 32.

The complex conjugate module 52 performs a complex conjugate function on the input 76 to produce a complex conjugate input. The one period delay module 54 delays the complex conjugate input to produce a delayed complex conjugate input. The multiplier 56 multiplies the input 76 with the delayed complex conjugate input to produce a correlated input 89. If the input 76 is valid, the correlated input 89 will resemble the output of multiplier 48 but delayed by one period of a repetitive signal in the preamble of a valid signal. If the input 76 is not a valid signal, the correlated input 89 will resemble noise. For example, for an IEEE802.11a compliant wireless communication device, the preamble includes a short training sequence and a long training sequence. The short training sequence includes repetitive signals that are 16 symbols in length while the long training period includes repetitive signals that are 16 symbols in length. As such, during the short training sequence, the one period delay is set to correspond to 16 symbols and for the long training sequence is set to correspond to 64 symbols. Thus, for the short training sequence, the correlated input 89 will resemble the output of multiplier 48, but delayed by the equivalent of 16 symbols.

The multiplier 56 provides the correlated input 89 to the moving average module 72 and to the delayed energy filter 58. The delayed energy filter 58 filters the correlated input 89 to produce an energy level of the correlated input. The absolute value module 62 generates an absolute value for the energy level of the correlated input and provides it to the gain module 64.

The gain module 64 adjusts the magnitude of the energy level of the correlated input based on a coarse probability 80 to produce the delayed energy level 86. The generation of the coarse probability 80 will be discussed subsequently. The state machine 60 receives the delayed energy level 86 and compares it with the real time energy level 84 to produce a probability of the input signal being a valid signal. The state machine 60 also receives a moving average 82, which it uses in comparison with the real time energy 84 to conclusively determine whether the input 76 is a valid signal or not. If the input 76 is a valid signal, the state machine 60 generates a valid signal indication 32. If the input 76 is not a valid signal, the state machine 60 does not generate the valid signal indication 32 and the demodulation module 18 is not enabled. Thus, power consumption is reduced since the data detection module 20 has substantially reduced and/or eliminated false identifications of valid signals.

The moving average module 72 produces a moving average of the correlated input 89. The absolute value module 70 provides an absolute value of the output of the moving average module 72 to produce the moving average 82. The state machine 60 interprets the moving average with respect to the real time energy level at the end of an initialization sequence (e.g., the end of the short training sequence and/or long training sequence for an 802.11a implementation). The state machine 60 then indicates that the input signal is valid when the interpretation of the moving average 82 with the respect to the real time energy level 84 was favorable.

The coarse correlation module 67 receives the complex digital signal 74 and produces a coarse correlation value 87. The coarse correlation module 67 is providing a simple correlation function that compares the complex digital signal 74 with a stored representation of a valid preamble of a signal. The interpreting module 68 receives the coarse correlation 87 and generates a coarse probability 80 therefrom. In general, the interpreting module 68 is interpreting the coarse correlation 87 to determine the likelihood that the input 76 is valid and to establish the gain level for the gain module 64 proportional to the likelihood. The more likely the input is valid, the greater the coarse probability 80 will be, thus the greater the gain level of the gain module 64 will be.

The correlation module 66 performs a correlation function on a long training sequence of a preamble on the sequence as will be subsequently described in FIGS. 3-9 to produce a correlation resultant 80. The state machine 60 further processes the correlation resultant to establish the validity of the received signal.

Figure 3:
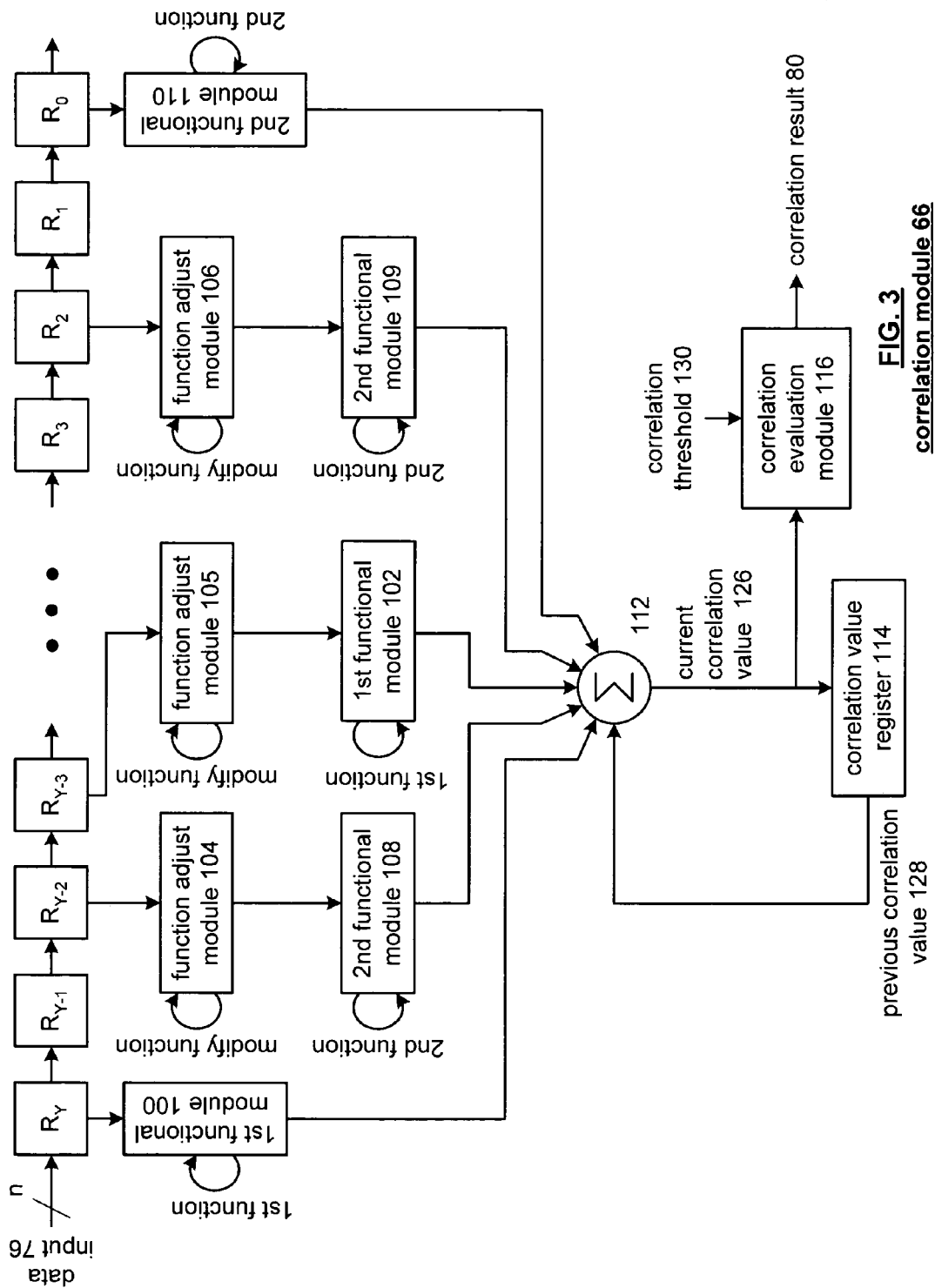
FIG. 3 is a schematic block diagram of a correlation module in accordance with the present invention.

FIG. 3 is a schematic block diagram of a correlation module 66 that includes a shift register module ($R_y$-$R_0$), a plurality of $1^{st}$ functional modules 100 and 102, a plurality of $2^{nd}$ functional modules 108, 109 and 110, a plurality of function adjust modules 104, 105 and 106, a summation module 112, a correlation value register 114, and a correlation evaluation module 116. The plurality of shift registers receives the input data 76, which may include n-bits of information, where n ranges from 1-32 or more. Each cycling of the correlation module 66 shifts, within the shift register module, a data element of input data 76 to the right. For example, data element that is currently stored in register $R_y$ on the next clocking interval will be shifted to register $R_{y-1}$.

The plurality of $1^{st}$ functional modules and $2^{nd}$ functional modules are operably coupled to the plurality of shift registers wherein the connection point corresponds to transitions in a valid training sequence. For example, if the training sequence is 8-bits long of 00 11 00 11, the $1^{st}$ (i.e., bit position zero) and last (i.e., bit position seven) registers would have a corresponding functional module attached thereto as well as functional modules to the bit position 2 (i.e., the first transition from 0 to 1), bit position 4 (i.e., the transition from 1 to 0) and bit position 6 (i.e., the next transition of 0 to 1). As such, bit positions 1, 3 and 5 would not have a corresponding functional module attached thereto, which reduces the circuitry needed to generate an accurate correlation value.

Figure 5:
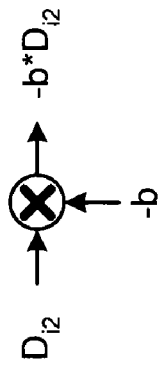
FIG. 5 is a schematic block diagram of a second functional module in accordance with the present invention.

As shown, a $1^{st}$ functional module 100 is coupled to the $1^{st}$ register location $R_y$ to perform a $1^{st}$ function on the data element stored therein. The $1^{st}$ function may correspond to the function illustrated in FIG. 4 where the 15' functional module multiplies the data element ($D_{i1}$) with a value "a" to produce $a*D_{i1}$. The output of the functional module is summed via summation module 112 with the output of the other functional modules. The last register location $R_0$ is coupled to a $2^{nd}$ functional module 110 that performs a $2^{nd}$ function upon the data elements stored therein. The $2^{nd}$ functional module 110 may perform a function as shown in FIG. 5 where the data element $D_{i2}$ is multiplied by a negative value (−b) to produce $-b \times D_{i2}$.

Figure 6:
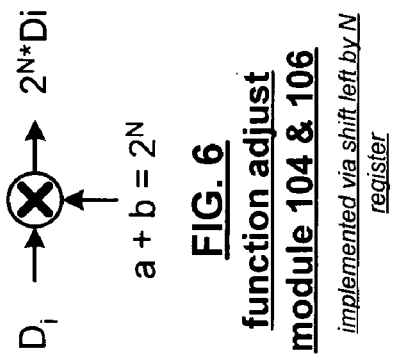
FIG. 6 is a schematic block diagram of a function adjust module in accordance with the present invention.
Figure 4:
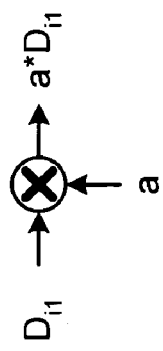
FIG. 4 is a schematic block diagram of a first functional module in accordance with the present invention.

Returning back to the discussion of FIG. 3, each of the remaining functional modules is attached to a corresponding register location via a corresponding functional module. The transition from $1^{st}$ to $2^{nd}$ functional module occurs for each transition in the expected training sequence. As such, a transition in the expected training sequence occurs at bit position 2, which would be stored in register $R_{y-2}$, at bit position 3, which is stored in register $R_{y-3}$ and at the bit position corresponding to register $R_2$. For each of these transitions, the functional adjust module 104 performs a modifying function upon the data elements stored in the corresponding register. The modifying function may be performed as illustrated in FIG. 6 where the data element $D_i$ is multiplied by $2^N$, where $2^N = a+b$ to produce $2^N \times D_i$. The output of the functional module is then provided to a corresponding $1^{st}$ or $2^{nd}$ functional module 108, 102, or 109 where the output of the corresponding functional module is provided to summation module 112.

For every interval of the correlation module 66, the summation module 112 sums the outputs of the $1^{st}$ and $2^{nd}$ functional modules with a previous correlation value 128 to produce a current correlation value 126. The current correlation value 126 is stored in the correlation value register 114 and acts as the previous correlation value 128 on the next cycle of the correlation module.

The correlation evaluation module 116 determines a maximum correlation value from the current correlation value 126 to produce a correlation result 80. When the registers $R_y$-$R_0$ store data elements that correspond to a training sequence, the current correlation value 126 will be at a maximum, otherwise it will be less than a maximum.

Figure 7:
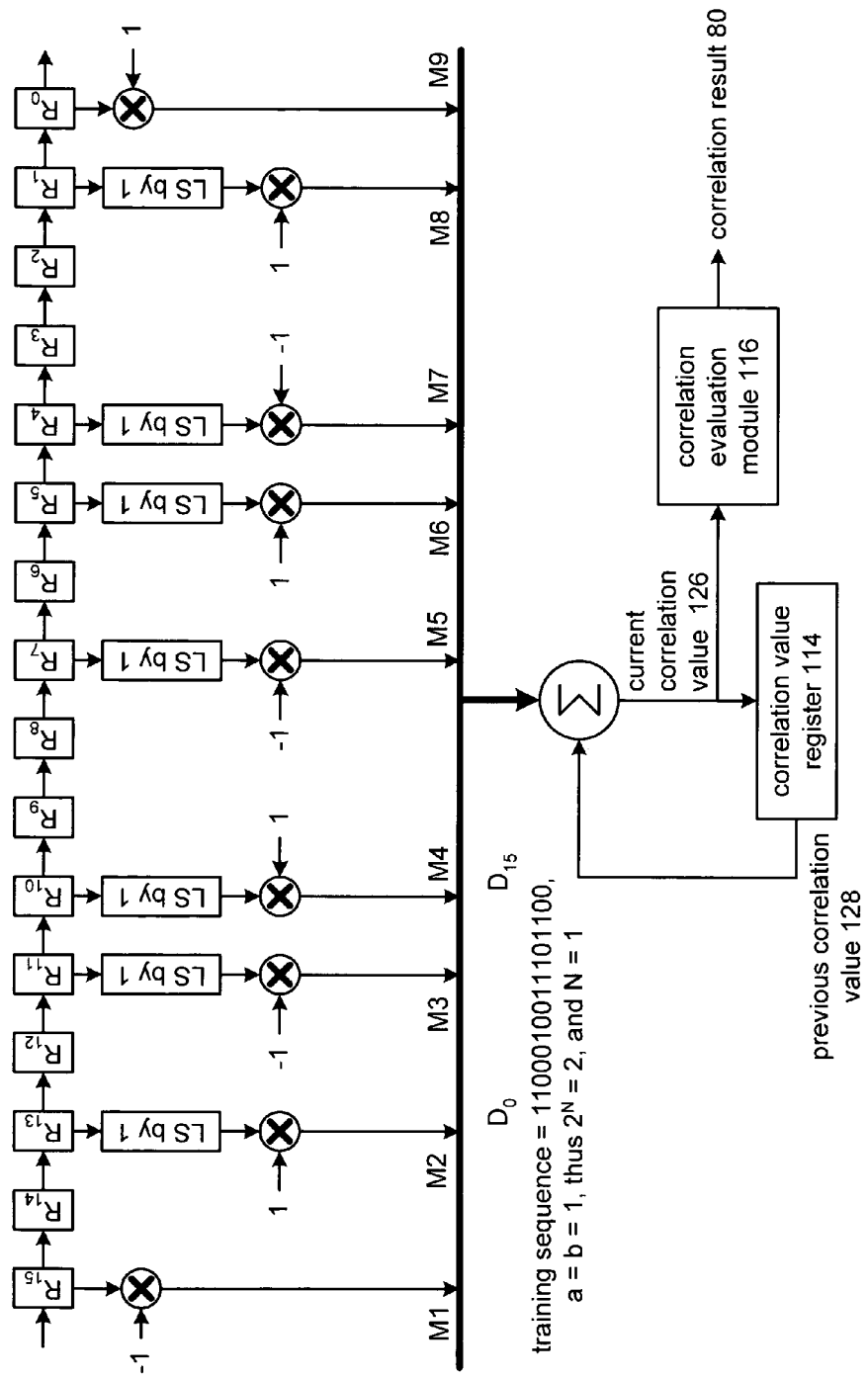
FIG. 7 is a schematic block diagram of an example correlation module in accordance with the present invention.

FIG. 7 is a schematic block diagram of a 16-bit correlation module where the training sequence is 1100 0100 1110 1100. The example further has "a" equal to "b" which equals 1, thus $2^N = 2$ and N=1. Thus, the function adjust modules correspond to doubling the input value, which may be achieved by a left-shift by one operation (LS by one).

The least significant bit $D_0$ of the training sequence is 1 and the most significant bit $D_{15}$ is 0. As such, when the training sequence is stored in registers $R_{15}$-$R_0$ the least significant bit $D_0$ will be stored in register $R_0$ and the most significant bit $D_{15}$ will be stored in register $R_{15}$. For each incrementing of the correlation module, the summation module 112 sums the outputs of the $1^{st}$ and $2^{nd}$ functional modules with a previous correlation value to produce the current correlation value 126. The correlation evaluation module 116 compares the current correlation value 126 with the correlation threshold 130 to produce the correlation result 80.

Referring to FIG. 8 and FIG. 7 simultaneously, FIG. 8 illustrates a timing/data diagram for the operation of the correlation module of FIG. 7. At time $T_{-1}$ and $T_{-2}$ no data is being received and all registers are set to zero. At time $T_0$ the $1^{st}$ bit ($D_0$) of the training sequence is received and stored in register 15. At this point, a current correlation value 126 is produced by summing the outputs of each functional module (i.e., the multipliers) M1-M9 with the previous correlation value 128, which in this instance is zero. The resulting new current correlation value 126 is −1.

At time $T_1$ the $2^{nd}$ bit ($D_1$) is stored in register 15 and $D_0$ is shifted to register 14. At this point, a new correlation value is produced by adding the previous correlation value 128 (e.g., −1) with the outputs of multipliers M1-M9 to produce a new current correlation value, which, in this example, equals −2.

The shifting of the training sequence through registers $R_0$-$R_{15}$ continues along with the determination of the current correlation value 126 until time $T_{15}$ is reached. At time $T_{15}$ each of the registers is storing a corresponding bit of the valid training sequence of this example. As such, the current correlation value jumps up to a value of 9, which, for this example, would exceed a correlations threshold (e.g., 7) producing a positive correlation result 80. Previous comparisons of the correlation value 126 with the correlation threshold 130 produce a negative correlation result. At time $T_{16}$ the training sequence is shifted 1-bit further to the right and a new data element, which in this example is a 1, is entered into register $R_{15}$. With this new value, a new correlation value is computed to be 3. Alternatively, once the valid training sequence has been verified, the correlation module may be disabled.

While the example of FIGS. 7 and 8 are for a 1-bit 16-bit length training sequence, the concept is expandable to a 64 data element, 16-bit per-data element training sequence as may be used to detect a long training sequence of an IEEE 802.11a preamble. In such an instance, the transitions for a real component of the training sequence would occur at data element locations 1, 6, 7, 11, 14, 18, 19, 22, 23, 24, 25, 26, 28, 29, 32, 35, 36, 38, 39, 40, 41, 42, 45, 46, 50, 53, 57, 58, and 63. For determining the transitions of an imaginary component of the training sequence the transitions occur at data element locations 3, 4, 9, 14, 17-22, 28-32, 37-41, 48, 49, 51-63.

Figure 9:
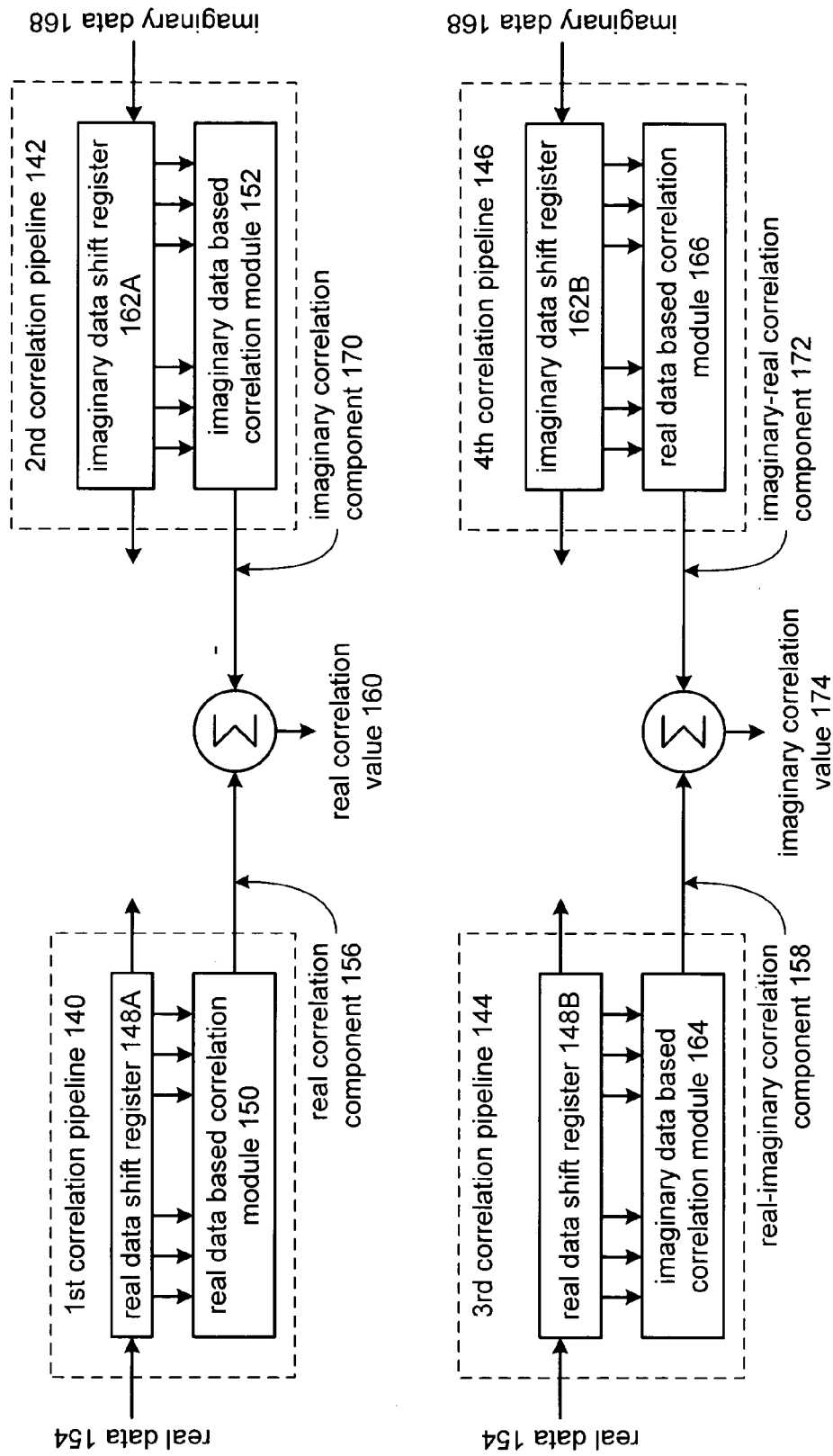
FIG. 9 is a schematic block diagram of another embodiment of a correlation module in accordance with the present invention.

FIG. 9 is a schematic block diagram of another embodiment of correlation module 66 that includes a $1^{st}$ correlation pipeline 140, a $2^{nd}$ correlation pipeline 142, a $3^{rd}$ correlation pipeline 144 and a $4^{th}$ correlation pipeline 146. The $1^{st}$ correlation pipeline 140 includes a real data shift register 148 and a real data based correlation module 150. With reference to FIGS. 7 and 9, the real data shift register 148 may correspond to registers locations $R_0$-$R_{15}$ and the real data based correlation module 150 may correspond to the multipliers and the "left-shift by one" functional modules. As such, the real data 154 of the input 76 is provided to the $1^{st}$ correlation pipeline to produce a real correlation component 156.

The $2^{nd}$ correlation pipeline 142 includes an imaginary data shift register 162A and an imaginary data based correlation module 152. The imaginary data shift register 162A receives imaginary data 168 of input 76 and produces an imaginary correlation component 170. Note that the imaginary data based correlation module 152 has the functional modules e.g., the multipliers, located based on the transitions within the imaginary component of the training sequence while the real data based correlation module 150 has the multipliers positioned at the transitions within the real component of the training sequence. The imaginary correlation component 170 is subtracted from the real correlation component 156 to produce a real correlation value 160.

The $3^{rd}$ correlation pipeline 144 includes a real data shift register 148A and an imaginary data based correlation module 164. The real data shift register 148A receives real data 154 of input 76. The imaginary data based correlation module 164 includes multipliers at the transitions of the anticipated imaginary component of the training sequence and produces a real-imaginary correlation component 158.

The $4^{th}$ correlation pipeline 146 includes an imaginary data shift register 162B and a real data shift based correlation module 166. The imaginary data shift register 162B receives the imaginary data 168 and provides it to the real data based correlation module 166, which produces an imaginary-real correlation component 172. The real-imaginary correlation component 158 is summed with the imaginary-real correlation component 172 to produce an imaginary correlation value 174. As one of average skill in the art will appreciate, the real data shift registers 148A and 148B may be one or two register banks. Similarly, the imaginary data shift registers 162A and B may be one set of register banks or two.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a correlation module for correlating a training sequence that reduces the component count to achieve a correlation value. By reducing the components, the speed at which a correlation may be accurately obtained is improved. As one of average skill in the art will appreciate, other embodiments may be derived from the teaching of the present invention without deviating from the scope of the claims.

What is claimed is:

1. A correlation module for correlating of a training sequence, the correlation module comprises:

a plurality of first functional modules, wherein each of the plurality of first functional modules performs a first function upon a first corresponding pipelined data element to produce a first corresponding value;

a plurality of second functional modules, wherein each of the plurality of second functional modules performs a second function upon a second corresponding pipelined data element to produce a second corresponding value, wherein the second function is a complimentary function of the first function;

a plurality of function adjust modules operably coupled to selected ones of the plurality of first functional modules and to selected ones of the plurality of second functional modules, wherein each of the plurality of function adjust modules modifies a pipelined data element to produce the first or the second corresponding pipelined data element, respectively, wherein the selected ones of the plurality of first functional modules and the selected ones of the plurality of second functional modules corresponds to transitions in an expected pattern of the training sequence;

a summation module operably coupled to sum the plurality of first corresponding values, the plurality of second corresponding values, and a previous correlation value to produce a current correlation value;

a correlation value register operably coupled to store the current correlation value and, for subsequent correlation determinations, to provide the current correlation value as the previous correlation value to the summation module; and correlation evaluation module operably coupled to compare the current correlation value with a correlation threshold to determine whether current pipelined data correlates with the expected pattern of the training sequence.

2. The correlation module of claim 1 further comprises:

each of the plurality of first functional modules perform a function of $Di_1 * a$, where $Di_1$ corresponds to the first corresponding pipelined data element and "a" corresponds to a first coefficient; and each of the plurality of second functional modules perform a function of $Di_2 *(-b)$, where $Di_2$ corresponds to the second corresponding pipelined data element and "b" corresponds to a second coefficient.

3. The correlation module of claim 2, wherein each of the plurality of function adjust modules multiplies an output data element of a preceding one of the plurality of first functional modules or the plurality of second functional modules with $2^N$, where $a+b=2^N$.

4. The correlation module of claim 3 further comprises: the "a" coefficient and the "b" coefficient are each equal to one and N equals one.

5. The correlation module of claim 3, wherein each of the plurality of function adjust modules comprises:

a shift left by N register.

6. The correlation module of claim 1, wherein the training sequence comprises:

a training sequence of a preamble of a wireless local area network.

7. The correlation module of claim 1 further comprises:

an input logarithmic module operably coupled to:

receive the training sequence to produce a received training sequence;

convert data elements of the received training sequence into logarithmic data elements; and provide the logarithm data elements to an initial functional module of the plurality of first or second functional modules;

an output logarithmic module operably coupled to:

receive a logarithmic correlation value from the summation module;

convert the logarithmic correlation value into a binary correlation value, such that the first function and the second function correspond to multiply and divide functions.

8. A correlation module for correlating a complex signal, the correlation module comprises:
a first correlation pipeline operably coupled to process real data elements of the complex signal with real coefficients of an expected complex signal to produce a real correlation component;
a second correlation pipeline operably coupled to process imaginary data elements of the complex signal with imaginary coefficients of the expected complex signal to produce an imaginary correlation component;
a third correlation pipeline operably coupled to process the real data elements of the complex signal with the imaginary coefficients to produce a real-imaginary correlation component;
a fourth correlation pipeline operably coupled to process the imaginary data elements of the complex signal with the real coefficients to produce an imaginary-real correlation component;
a first summation module operably coupled to subtract the imaginary correlation component from the real correlation component to produce a real correlation value; and
a second summation module operably coupled to sum the imaginary-real correlation component with the real-imaginary correlation component to produce an imaginary correlation value.

9. The correlation module of claim 8, wherein each of the first, second, third, and fourth correlation pipelines comprises:
a plurality of first functional modules, wherein each of the plurality of first functional modules performs a first function upon a first corresponding pipelined data element to produce a first corresponding value;
a plurality of second functional modules, wherein each of the plurality of second functional modules performs a second function upon a second corresponding pipelined data element to produce a second corresponding value, wherein the second function is a complimentary function of the first function;
a plurality of function adjust modules operably coupled to selected ones of the plurality of first functional modules and to selected ones of the plurality of second functional modules, wherein each of the plurality of function adjust modules modifies a pipelined data element to produce the first or the second corresponding pipelined data element, respectively, wherein the selected ones of the plurality of first functional modules and the selected ones of the plurality of second functional modules corresponds to transitions in an expected pattern of the training sequence;
a summation module operably coupled to sum the plurality of first corresponding values, the plurality of second corresponding values, and a previous correlation value to produce a current correlation value; and
a correlation value register operably coupled to store the current correlation value and, for subsequent correlation determinations, to provide the current correlation value as the previous correlation value to the summation module, wherein the current correlation value is the real correlation component, the real-imaginary correlation component, the imaginary-real correlation component and the imaginary correlation component.

10. The correlation module of claim 9 further comprises:
each of the plurality of first functional modules perform a function of $Di_1*a$, where $Di_1$ corresponds to the first corresponding pipelined data element and "a" corresponds to a first coefficient; and
each of the plurality of second functional modules perform a function of $Di_2*(-b)$, where $Di_2$ corresponds to the second corresponding pipelined data element and "b" corresponds to a second coefficient.

11. The correlation module of claim 10, wherein each of the plurality of function adjust modules multiplies an output data element of a preceding one of the plurality of first functional modules or the plurality of second functional modules with $2^N$, where $a+b=2^N$.

12. The correlation module of claim 11 further comprises:
the "a" coefficient and the "b" coefficient are each equal to one and N equals one.

13. The correlation module of claim 11, wherein each of the plurality of function adjust modules comprises:
a shift left by N register.

14. The correlation module of claim 12, wherein the complex number comprises:
a long training sequence of a preamble of a wireless local area network.

15. A radio receiver comprises:
low noise amplifier operably coupled to amplify a radio frequency (RF) signal to produce an amplified RF signal;
down conversion module operably coupled to convert the amplified RF signal into a baseband signal;
data recovery module operably coupled to recapture data from the baseband signal, wherein the data recovery module includes:
data detection module operably coupled to detect validity of the baseband signal to produce a valid signal indication; and
demodulation module operably coupled to demodulate the baseband signal to produce the data in accordance with the valid signal indication, wherein the data detection module includes:
a correlation module for correlating of a training sequence of the baseband signal, the correlation module includes:
a plurality of first functional modules, wherein each of the plurality of first functional modules performs a first function upon a first corresponding pipelined data element to produce a first corresponding value;
a plurality of second functional modules, wherein each of the plurality of second functional modules performs a second function upon a second corresponding pipelined data element to produce a second corresponding value, wherein the second function is a complimentary function of the first function;
a plurality of function adjust modules operably coupled to selected ones of the plurality of first functional modules and to selected ones of the plurality of second functional modules, wherein each of the plurality of function adjust modules modifies a pipelined data element to produce the first or the second corresponding pipelined data element, respectively, wherein the selected ones of the plurality of first functional modules and the selected ones of the plurality of second functional modules corresponds to transitions in an expected pattern of the training sequence;

a summation module operably coupled to sum the plurality of first corresponding values, the plurality of second corresponding values, and a previous correlation value to produce a current correlation value;

a correlation value register operably coupled to store the current correlation value and, for subsequent correlation determinations, to provide the current correlation value as the previous correlation value to the summation module; and correlation evaluation module operably coupled to compare the current correlation value with a correlation threshold to determine whether current pipelined data correlates with the expected pattern of the training sequence, wherein valid signal indication is at least partially based on the current correlation value.

16. The radio receiver of claim 15 further comprises:
each of the plurality of first functional modules perform a function of $Di_1*a$, where $Di_1$ corresponds to the first corresponding pipelined data element and "a" corresponds to a first coefficient; and
each of the plurality of second functional modules perform a function of $Di_2*(-b)$, where $Di_2$ corresponds to the second corresponding pipelined data element and "b" corresponds to a second coefficient.

17. The radio receiver of claim 16, wherein each of the plurality of function adjust modules multiplies an output data element of a preceding one of the plurality of first functional modules or the plurality of second functional modules with $2^N$, where $a+b=2^N$.

18. The radio receiver of claim 17 further comprises:
the "a" coefficient and the "b" coefficient are each equal to one and N equals one.

19. The radio receiver of claim 17, wherein each of the plurality of function adjust modules comprises:
a shift left by N register.

20. The radio receiver of claim 15, wherein the training sequence comprises:
a training sequence of a preamble of a wireless local area network.

21. The radio receiver of claim 15, wherein the correlation module further comprises:
an input logarithmic module operably coupled to:
receive the training sequence to produce a received training sequence;
convert data elements of the received training sequence into logarithmic data elements; and
provide the logarithm data elements to an initial functional module of the plurality of first or second functional modules;
an output logarithmic module operably coupled to:
receive a logarithmic correlation value from the summation module;
convert the logarithmic correlation value into a binary correlation value, such that the first function and the second function correspond to multiply and divide functions.

22. A radio receiver comprises:
low noise amplifier operably coupled to amplify a radio frequency (RF) signal to produce an amplified RF signal;
down conversion module operably coupled to convert the amplified RF signal into a baseband signal;
data recovery module operably coupled to recapture data from the baseband signal, wherein the data recovery module includes:
data detection module operably coupled to detect validity of the baseband signal to produce a valid signal indication; and
demodulation module operably coupled to demodulate the baseband signal to produce the data in accordance with the valid signal indication, wherein the data detection module includes:
a correlation module for correlating of a complex signal of the baseband signal, the correlation module includes:
a first correlation pipeline operably coupled to process real data elements of the complex signal with real coefficients of an expected complex signal to produce a real correlation component;
a second correlation pipeline operably coupled to process imaginary data elements of the complex signal with imaginary coefficients of the expected complex signal to produce an imaginary correlation component;
a third correlation pipeline operably coupled to process the real data elements of the complex signal with the imaginary coefficients to produce a real-imaginary correlation component;
a fourth correlation pipeline operably coupled to process the imaginary data elements of the complex signal with the real coefficients to produce an imaginary-real correlation component;
a first summation module operably coupled to subtract the imaginary correlation component from the real correlation component to produce a real correlation value; and
a second summation module operably coupled to sum the imaginary-real correlation component with the real-imaginary correlation component to produce an imaginary correlation value.

23. The radio receiver of claim 22, wherein each of the first, second, third, and fourth correlation pipelines comprises:
a plurality of first functional modules, wherein each of the plurality of first functional modules performs a first function upon a first corresponding pipelined data element to produce first corresponding value;
a plurality of second functional modules, wherein each of the plurality of second functional modules performs a second function upon a second corresponding pipelined data element to produce a second corresponding value, wherein the second function is a complimentary function of the first function;
a plurality of function adjust modules operably coupled to selected ones of the plurality of first functional modules and to selected ones of the plurality of second functional modules, wherein each of the function adjust modules modifies a pipelined data element to produce the first or the second corresponding pipelined data element, respectively, wherein the selected ones of the plurality of first functional modules and the selected ones of the plurality of second functional modules corresponds to transitions in an expected pattern of the training sequence;
a summation module operably coupled to sum the plurality of first corresponding values, the plurality of second corresponding values, and a previous correlation value to produce a current correlation value; and
a correlation value register operably coupled to store the current correlation value and, for subsequent correlation determinations, to provide the current correlation value as the previous correlation value to the summation module, wherein the current correlation value is the real correlation component, the real-imaginary correlation component, the imaginary-real correlation component and the imaginary correlation component.

24. The radio receiver of claim 23, wherein the correlation module further comprises:

each of the plurality of first functional modules perform a function of $Di_1 * a$, where $Di_1$ corresponds to the first corresponding pipelined data element and "a" corresponds to a first coefficient; and each of the plurality of second functional modules perform a function of $Di_2 *(-b)$, where $Di_2$ corresponds to the second corresponding pipelined data element and "b" corresponds to a second coefficient.

25. The radio receiver of claim 24, wherein each of the plurality of function adjust modules multiplies an output data element of a preceding one of the plurality of first functional modules or the plurality of second functional modules with $2^N$, where $a+b=2^N$.

26. The radio receiver of claim 25 further comprises:

the "a" coefficient and the "b" coefficient are each equal to one and N equals one.

27. The radio receiver of claim 25, wherein each of the plurality of function adjust modules comprises:

a shift left by N register.

28. The radio receiver of claim 22, wherein the complex number comprises:

a long training sequence of a preamble of a wireless local area network.

* * * * *